US010627563B2

(12) United States Patent
Kim et al.

(10) Patent No.: US 10,627,563 B2
(45) Date of Patent: Apr. 21, 2020

(54) BACKLIGHT MODULE AND DISPLAY DEVICE

(71) Applicant: BOE TECHNOLOGY GROUP CO., LTD., Beijing (CN)

(72) Inventors: Kiman Kim, Beijing (CN); Chulgyu Jung, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/554,636

(22) PCT Filed: Feb. 22, 2017

(86) PCT No.: PCT/CN2017/074366
§ 371 (c)(1),
(2) Date: Aug. 30, 2017

(87) PCT Pub. No.: WO2017/197943
PCT Pub. Date: Nov. 23, 2017

(65) Prior Publication Data
US 2019/0064422 A1 Feb. 28, 2019

(30) Foreign Application Priority Data
May 18, 2016 (CN) .......................... 2016 1 0331066

(51) Int. Cl.
*F21V 8/00* (2006.01)
(52) U.S. Cl.
CPC ......... *G02B 6/0053* (2013.01); *G02B 6/0056* (2013.01); *G02B 6/0088* (2013.01); *G02B 6/0091* (2013.01); *G02B 6/0055* (2013.01)

(58) Field of Classification Search
CPC .. G02B 6/0053; G02B 6/0088; G02B 6/0056; G02B 6/0091; G02B 6/0055
USPC ........................................................ 349/65
See application file for complete search history.

(56) References Cited

U.S. PATENT DOCUMENTS

| | | | |
|---|---|---|---|
| 2004/0061812 | A1 | 4/2004 | Maeda |
| 2006/0098456 | A1 | 5/2006 | Sakamoto et al. |
| 2009/0231715 | A1 | 9/2009 | Hiroya et al. |
| 2014/0286044 | A1 | 9/2014 | Johnson et al. |
| 2015/0226999 | A1* | 8/2015 | Fuchida ............ G02F 1/133606 349/96 |

(Continued)

FOREIGN PATENT DOCUMENTS

| | | |
|---|---|---|
| CN | 1475844 A | 2/2004 |
| CN | 1773349 A | 5/2006 |
| CN | 101533113 A | 9/2009 |

(Continued)

OTHER PUBLICATIONS

International Search Report and Written Opinion for Application No. PCT/CN2017/074366, dated Jun. 2, 2017, 11 Pages.

(Continued)

*Primary Examiner* — Nathanael R Briggs
*Assistant Examiner* — William D Peterson
(74) *Attorney, Agent, or Firm* — Brooks Kushman P.C.

(57) ABSTRACT

A backlight module and a display device are provided. The backlight module includes a light guide plate and a prism film arranged at a light-exiting side of the light guide plate. The display device includes the above backlight module and a lower polarizer arranged on the prism film.

17 Claims, 5 Drawing Sheets

(56) References Cited

U.S. PATENT DOCUMENTS

2015/0301384 A1   10/2015  Koike et al.
2017/0293055 A1   10/2017  Sun et al.

FOREIGN PATENT DOCUMENTS

| | | | |
|---|---|---|---|
| CN | 102354007 A | | 2/2012 |
| CN | 102401931 A | * | 4/2012 |
| CN | 102401931 A | | 4/2012 |
| CN | 102460285 A | | 5/2012 |
| CN | 202229028 U | | 5/2012 |
| CN | 202469729 U | | 10/2012 |
| CN | 203703815 U | | 7/2014 |
| CN | 104204924 A | | 12/2014 |
| CN | 104456412 A | | 3/2015 |
| CN | 104620142 A | | 5/2015 |
| CN | 104914614 A | | 9/2015 |
| CN | 105116477 A | | 12/2015 |
| CN | 105190369 A | | 12/2015 |
| CN | 105759506 A | | 7/2016 |
| JP | 2001166116 A | | 6/2001 |

OTHER PUBLICATIONS

First Office Action for Chinese Application No. 201610331066.8, dated Jul. 4, 2018, 8 Pages.

\* cited by examiner

BACKLIGHT MODULE AND DISPLAY DEVICE

CROSS-REFERENCE TO RELATED APPLICATIONS

This application is the U.S. national phase of PCT Application No. PCT/CN2017/074366 filed on Feb. 22, 2017, which claims priority to Chinese Patent Application No. 201610331066.8 filed on May 18, 2016, which are incorporated herein by reference in their entirety.

TECHNICAL FIELD

The present disclosure relates to the field of liquid crystal display, and in particular to a backlight module and a display device.

BACKGROUND

In the related art, in order to reduce a thickness of a mobile liquid crystal display device to improve a mobility and an appearance thereof, it is commonly required to thin a panel glass or reuse an optical film of a backlight portion, so as to reduce a thickness of the panel. However, the technical requirement of the above method is high.

SUMMARY

In view of this, a backlight module and a display device are provided in the present disclosure, to make the display device thinner.

In order to achieve the above objective, a backlight module is provide in the present disclosure, comprising a light guide plate and a prism film arranged at a light-exiting side of the light guide plate.

Optionally, the prism film is adhered onto a light-exiting surface of the light guide plate through an adhesive.

Optionally, the adhesive is arranged at an edge of the light-exiting surface of the light guide plate.

Optionally, a thickness of the adhesive is in a range from 5 microns to 3000 microns.

Optionally, the adhesive is at least one of a resin adhesive, a silica gel adhesive and a rubber adhesive.

Optionally, the thickness of the adhesive is in a range from 100 microns to 1000 microns.

Optionally, the light guide plate and the prism film are integrated.

Optionally, the prism film is an inverse prism film provide with a triangular prism unit, and an apex of the triangular prism unit is arranged opposite to the light-exiting surface of the light guide plate; the apex of the triangular prism unit is spaced apart from the light-exiting surface of the light guide plate.

Optionally, the light guide plate is a glass light guide plate.

Optionally, the backlight module further includes a light bar provided with a light source, where a portion of the adhesive opposite to the light bar is provided with a gap, and the gap is arranged opposite to the light source.

Optionally, a spacer is arranged between the light guide plate and the inverse prism film.

Optionally, the spacer and the light guide plate are integrated.

Optionally, an adhesive layer is arranged at a side of the spacer adjacent to the inverse prism film, to adhere the spacer onto the inverse prism film.

Optionally, adhesive layers are respectively arranged at a side of the spacer adjacent to the inverse prism film and a side of the spacer adjacent to the light guide plate, to adhere the spacer onto the inverse prism film and the light guide plate.

A display device is further provided in the present disclosure, including the above backlight module and a polarizer arranged on the prism film.

Optionally, the prism film and the polarizer are integrated.

Optionally, the polarizer, the prism film and the light guide plate are integrated.

Optionally, the display device further includes a first substrate, a second substrate and a display layer arranged between the first substrate and the second substrate, where the backlight module is arranged at a side of the second substrate away from the display layer, the polarizer is arranged between the second substrate and the backlight module, and the second substrate, the polarizer, the prism film and the light guide plate are integrated.

A mobile terminal is further provided in the present disclosure, including the above display device.

According to the backlight module and the display device in at least one embodiment of the present disclosure, the prism film is arranged at the light-exiting side of the light guide plate, thereby leaving such a gap between the prism film and the light guide plate that the prism unit may not scratch the guide light plate, without leaving any redundant space there between, thereby reducing the thickness of the backlight module and reducing the overall thickness of the display module. According to the display device in at least one embodiment of the present disclosure, the prism film and the lower polarizer are formed integrally, so the display panel and the backlight module are formed integrally, thereby reducing the overall thickness of the display device.

DETAILED DESCRIPTION

In order to make the technical issues, the technical solutions and the advantages of the present disclosure more apparent, the present disclosure will be described hereinafter in details in conjunction with the drawings and embodiments.

Figure 1A:
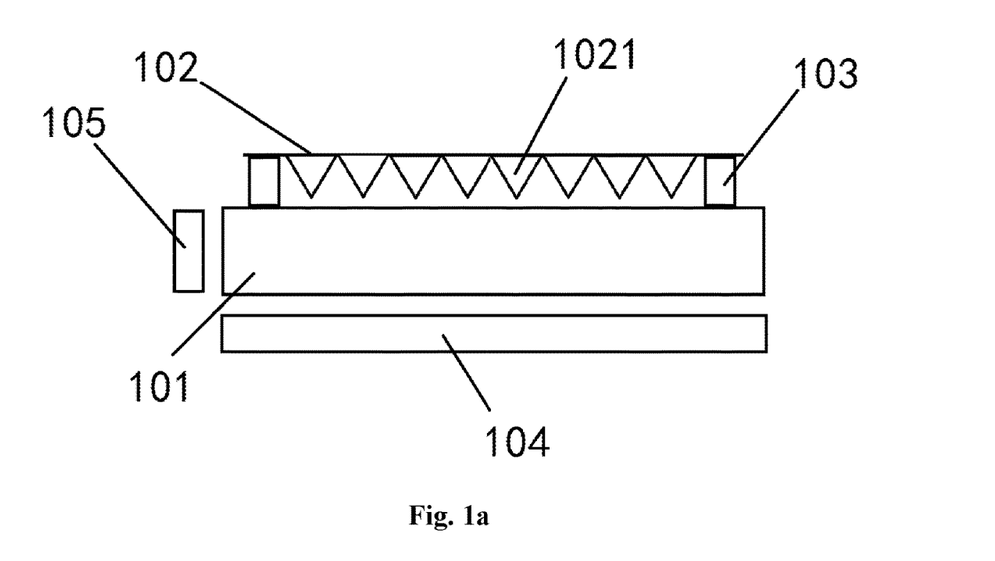
FIG. 1a is a schematic view of a backlight module in at least one embodiment of the present disclosure.

A backlight module is provided in at least one embodiment of the present disclosure. As shown in FIG. 1a, the backlight module includes a light guide plate 101 and a prism film 102 arranged at a light-exiting side of the light guide plate 101.

Figure 2:
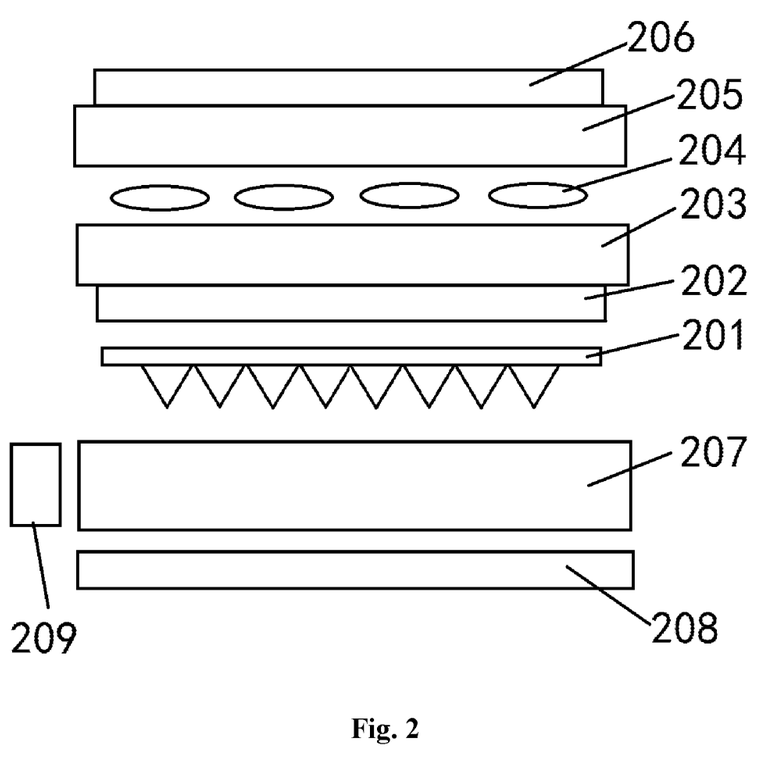
FIG. 2 is a schematic view of a display device in the related art.

In the related art, the structure of the prism is as shown in FIG. 2. As shown in FIG. 2, a prism sheet 201 is arranged in a display panel and adjacent to a lower polarizer 202. An array substrate 203, a liquid crystal layer 204, a color filter substrate 205 and an upper polarizer 206 are arranged in sequence at a side of the lower polarizer 202 away from the prism sheet 201. A light guide plate 207, a reflective sheet 208 and a light source 209 are arranged at a side of the prism sheet 201 away from the lower polarizer 202. When assembling the display panel and the backlight module, in order to prevent the prism film from scratching the light guide plate 207 of the backlight module, a large gap is commonly left there between, so the overall thickness of the display device is increased substantially.

According to the backlight module in at least one embodiment of the present disclosure, the prism film is arranged at the light-exiting side of the light guide plate, thereby reducing the distance between the prism film and the light guide plate. When assembling the prism film and the light guide plate, a gap may be left between the prism film and the light guide plate based on an actual thickness of the prism film, without leaving any redundant space there between, thereby reducing the thickness of the backlight module. In the subsequent process of assembling the prism film and the display panel, the display panel may be in contact with the prism film or the display panel may be spaced apart from the prism film by a small interval, thereby further reducing the overall thickness of the display device. Therefore, the backlight module in at least one embodiment of the present disclosure may be thinner, and thus the display device provided with the above backlight module may thinner. In addition, the prism film in at least one embodiment of the present disclosure is thinner than the prism sheet in the related art, thereby further reducing the thickness of the backlight module.

Referring to FIG. 1a, it should be appreciated that, the backlight module in at least one embodiment of the present disclosure further includes a reflective sheet 104, a light source 105, etc.

In at least one embodiment of the present disclosure, the light guide plate is adhered onto the prism film.

In at least one embodiment of the present disclosure, a spacer is arranged between the light guide plate and the prism film.

Figure 1B:
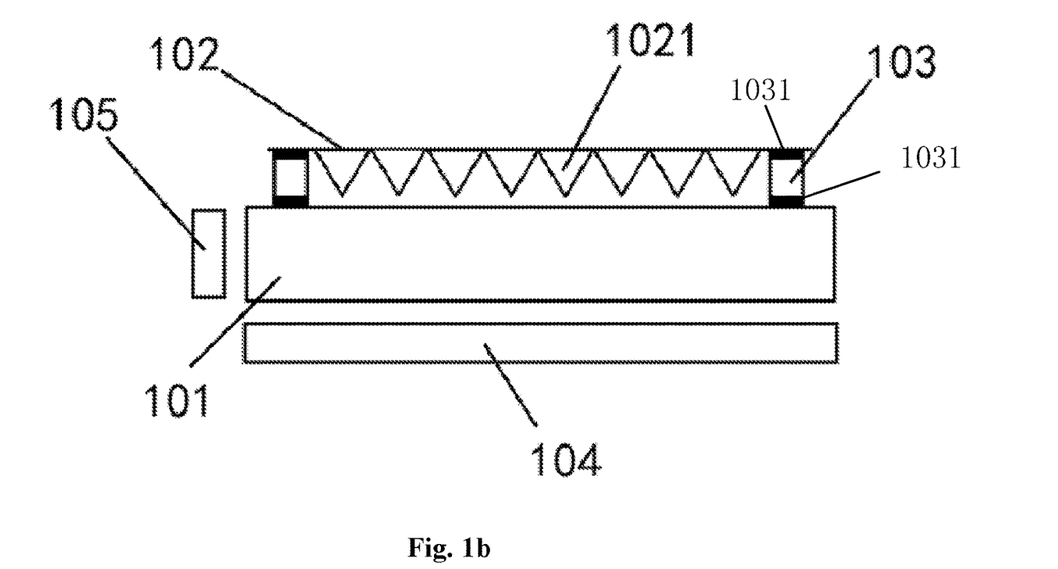
FIG. 1b is a schematic view of a backlight module in at least one embodiment of the present disclosure.

Referring to FIG. 1b, in at least one embodiment of the present disclosure, adhesive layers 1031 are respectively arranged at two sides of the spacer, to adhere the spacer onto the prism film and the light guide plate.

In at least one embodiment of the present disclosure, the spacer is arranged between the light guide plate and the prism film, and the spacer is arranged at the non-display region.

In at least one embodiment of the present disclosure, the spacer is arranged between the light guide plate and the prism film, the adhesive layers are respectively arranged at two sides of the spacer, to adhere the spacer onto the prism film and the light guide plate.

Figure 3:
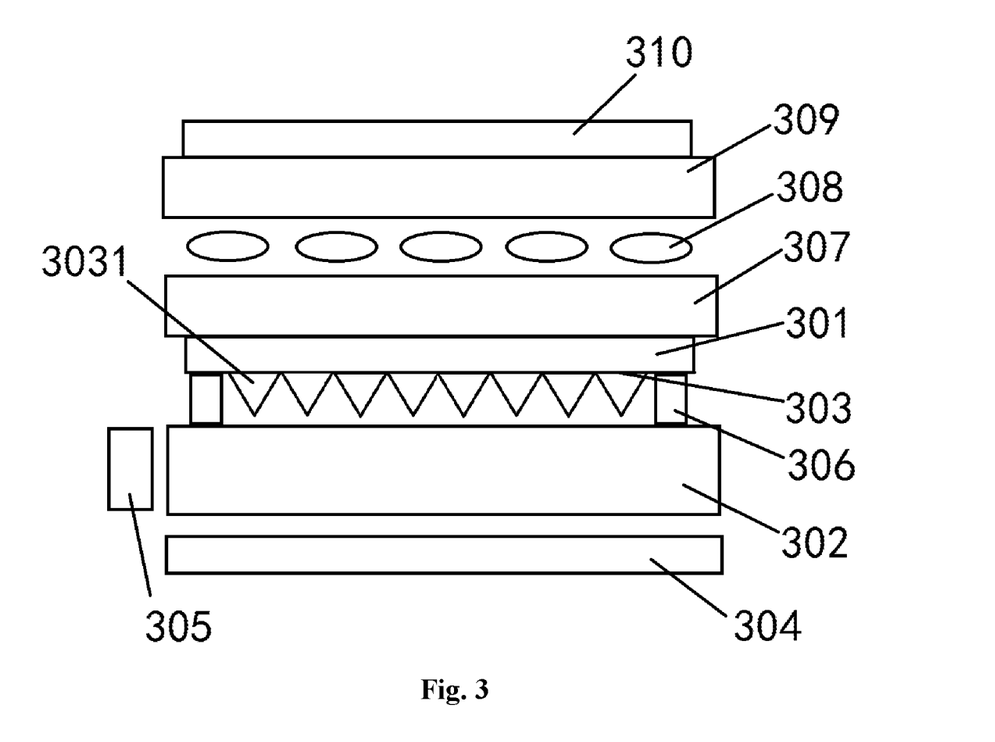
FIG. 3 is a schematic view of a display device in at least one embodiment of the present disclosure.
Figure 4A:
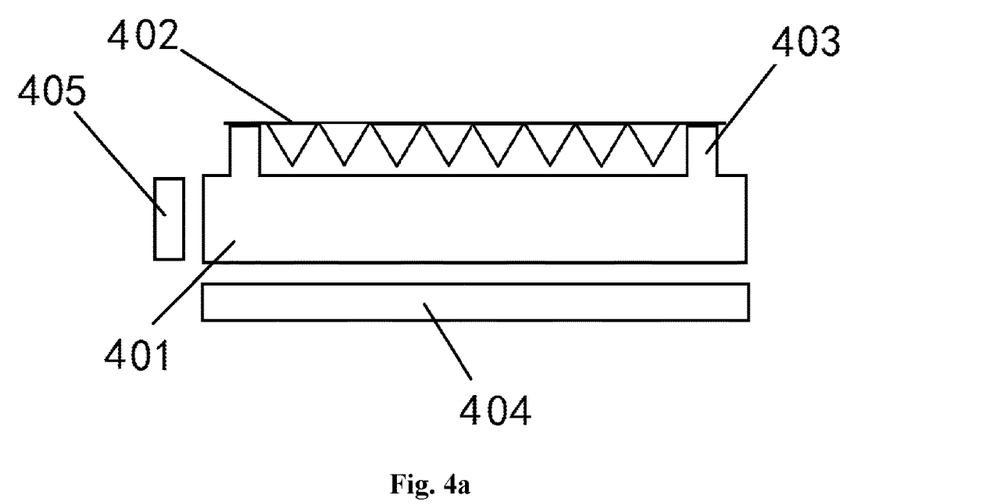
FIG. 4a is a schematic view of a display device in at least one embodiment of the present disclosure.
Figure 4B:
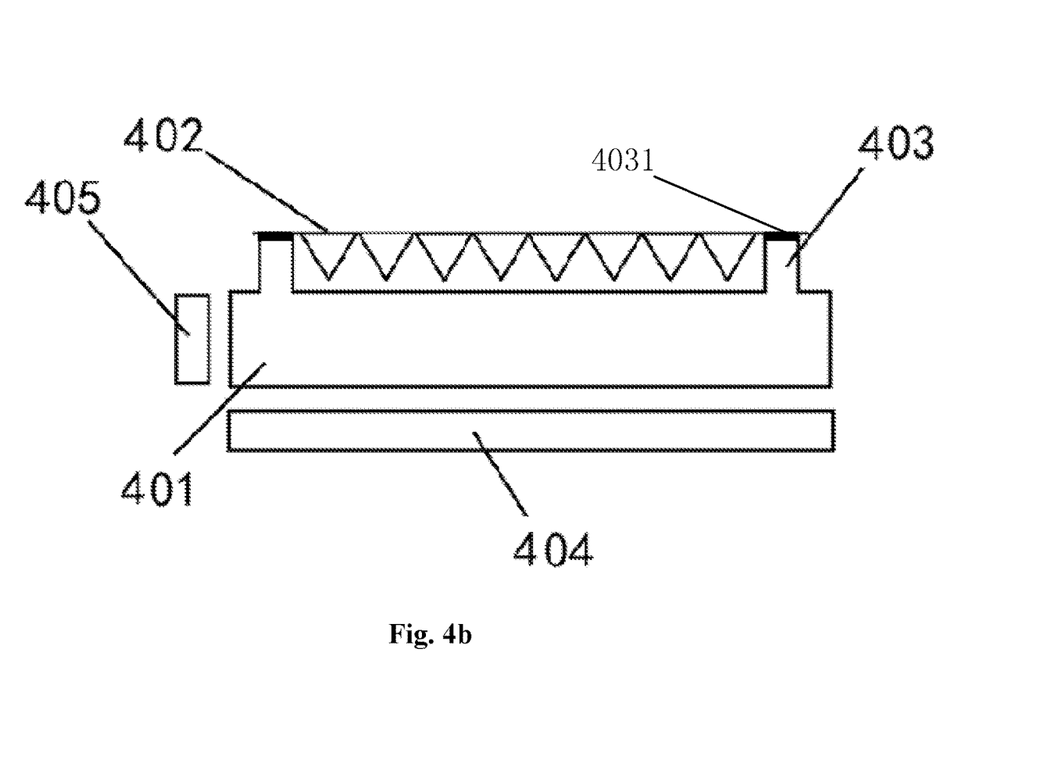
FIG. 4b is a schematic view of a display device in at least one embodiment of the present disclosure.

In at least one embodiment of the present disclosure, the spacer and the light guide plate are formed integrally. As shown in FIG. 4a, the spacer 403 is arranged at the non-display region and between the light guide plate 401 and the prism film 402. Generally, the prism film 402 is an inverse prism film provided with a plurality of inverted-triangle prism units 4021. In order to prevent apexes of the prism units 4021 from touching the light guide plate 401 to break the light guide plate 401 and the prism film 402, the spacer 403 needs to be arranged between the light guide plate 401 and the prism film 402, so as to support the light guide plate 401 and the prism film 402 and prevent them from touching each other. The reflective sheet 404 and the light source 405 may be arranged in the same manner as FIG. 3. As shown in FIG. 4b, an adhesive layer 4031 is arranged at a side of the spacer 403 adjacent to the prism film 402, to adhere the spacer 403 onto the prism film 402.

In at least one embodiment of the present disclosure, referring to FIG. 1a, the prism film 102 is adhered onto a light-exiting surface of the light guide plate 101 through an adhesive 103, and the adhesive 103 is arranged at an edge of the light-exiting surface of the light guide plate 101.

It is simple and easy to be implemented to use the adhesive, and the light guide plate and the prism film may not be broken. The adhesive itself may also serve as a supporter between the light guide plate and the prism film. By adjusting a thickness of the adhesive, a large enough gap may be left between the light guide plate and the prism film, thereby preventing the prism units from touching the light guide plate to scratch the light guide plate.

In at least one embodiment of the present disclosure, a thickness of the adhesive is in a range from 5 microns to 3000 microns.

In the case that the thickness of the adhesive is in a range from 5 microns to 3000 microns, the display device may not be too thick, and apexes of the prisms of the prism film may not scratch the light guide plate to break the light guide plate.

In at least one embodiment of the present disclosure, the adhesive is a resin adhesive, a silica gel adhesive or a rubber adhesive.

In at least one embodiment of the present disclosure, the thickness of the adhesive is in a range from 100 microns to 1000 microns.

In the case that the thickness of the adhesive is in a range from 100 microns to 1000 microns, the gap is large enough to receive most types of prism film.

In at least one embodiment of the present disclosure, the light guide plate and the prism film are formed integrally.

In at least one embodiment of the present disclosure, referring to FIG. 1a, the prism film is an inverses prism film provided with triangular prism units 1021, and an apex of each triangular prism unit 1021 is arranged opposite to the light-exiting surface of the light guide plate 101.

In at least one embodiment of the present disclosure, the prism film further includes a thin film base. For example, the thin film base is a glass thin film. In the case that the prism film is arranged above the light guide plate, a thickness of the base of the prism film may be reduced significantly in compare with the related art. The thickness of the base of the prism film may be at a thickness level of a film material, thereby reducing an overall thickness of the prism film and further reducing the overall thickness of the display device.

In at least one embodiment of the present disclosure, the light guide plate is a glass light guide plate which may increase the transmittance.

Figure 5:
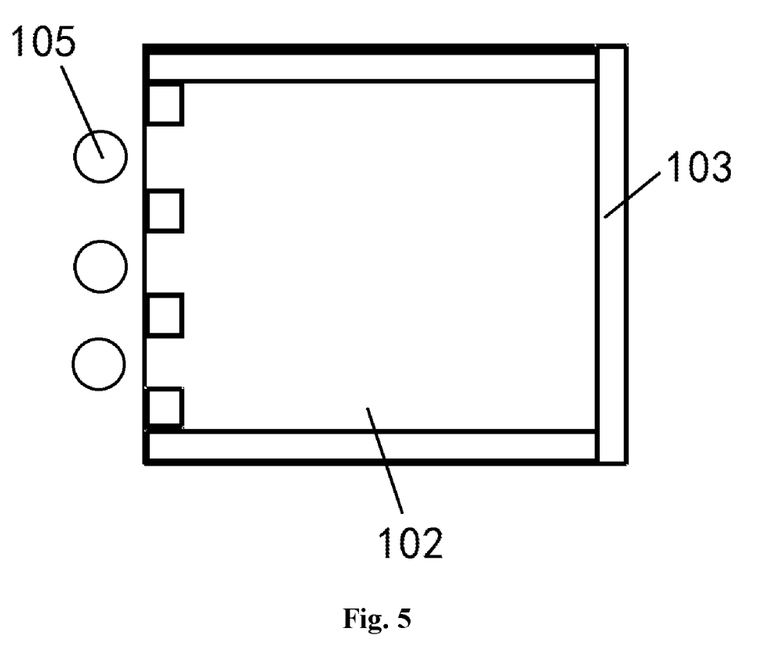
FIG. 5 is a top view of a display device in at least one embodiment of the present disclosure.

In at least one embodiment of the present disclosure, as shown in FIG. 5, a portion of the adhesive 103 opposite to the light bar is provided with a gap, and the gap is arranged opposite to the light source 105 of the light bar.

A display device is further provided in at least one embodiment of the present disclosure, including the backlight module in at least one embodiment of the present disclosure and a polarizer. The backlight module includes the light guide plate and the prism film in at least one embodiment of the present disclosure. The polarizer is arranged at the light-exiting side of the prism film.

According to the display device in at least one embodiment of the present disclosure, the polarizer is arranged on the prism film, thereby significantly reducing the gap between display panel and the backlight module, reducing the overall thickness of the display device, and forming an ultrathin liquid crystal display device with a normal mechanical strength.

In at least one embodiment of the present disclosure, the prism film may be adhered onto the polarizer. In the case that the prism film is an inverse prism film, the gap between the prism film and the polarizer may be very small in the case that the inverse prism film is adhered onto the polarizer, without leaving any redundant space between the display panel and the backlight module, thereby reducing the overall thickness of the display device.

In at least one embodiment of the present disclosure, the prism film and the polarizer are formed integrally.

In the case that the prism film and the polarizer are formed integrally, the display panel and the backlight module substrate are formed integrally, thereby reducing the overall thickness of the display device significantly.

In at least one embodiment of the present disclosure, the polarizer, the prism film and the light guide plate are formed integrally, thereby further reducing the overall thickness of the display device.

In at least one embodiment of the present disclosure, the display device further includes a first substrate, a second substrate and a display layer arranged between the first substrate and the second substrate, the backlight module is arranged at a side of the second substrate away from the display layer, the polarizer is arranged between the second substrate and the backlight module. The second substrate, the polarizer, the prism film and the light guide plate are formed integrally. The display layer may be a liquid crystal layer.

A display device is further provided in at least one embodiment of the present disclosure. Referring to FIG. 3, the display device includes a reflective sheet 304, a light guide plate 302, an LED light source 305, an adhesive 306, a prism film 303, a lower polarizer 301, an array substrate 307, a liquid crystal layer 308, a color filter substrate 309 and an upper polarizer 310. The prism film 303 is an inverse prism film provided with triangular prism units 3031, and an apex of each triangular prism unit 3031 is arranged opposite to the light-exiting surface of the light guide plate 302. The reflective sheet 304 is arranged at a side of the light guide plate 302 away from the light-exiting surface of the light guide plate 302. The adhesive 306 is arranged at the non-display region and between the prism film 303 and the light-exiting surface of the light guide plate 302. The lower polarizer 301 and the prism film 303 are formed integrally, and the lower polarizer 301 is arranged at a side of the prism film 303 away from the light guide plate 302. An array substrate 307, a liquid crystal layer 308, a color filter substrate 309 and an upper polarizer 310 are arranged in sequence at a side of the lower polarizer 301 away from the prism sheet 303.

To be specific, the light guide plate 302 is provided with lattice points. The lattice points are patterns on the light guide plate 302 to enable the light beams which enter into the light guide plate from a side face thereof to transmit to the light-exiting surface by an angle larger than 60 degree. As such, the emergent light beams transmitted towards side face of the light guide plate by an large emergent angle may be converged after passing the inverse prism film above the light guide plate. The width of the pattern on the light guide plate is not limited. Because the pattern is not identified, the pattern may be as narrow as possible to enable the light beams to pass through. The pattern may be an ink pattern, a V-shaped pattern, a U-shaped pattern, a spherical pattern, etc.

To be specific, the light guide plate 302 is a glass light guide plate.

To be specific, as shown in FIG. 5, the adhesive 103 is substantially rectangular, a portion of the adhesive 103 at the light-entering side of the light guide plate 102 is provided with a gap, and the gap is arranged opposite to the LED light source 105.

In the case that the light guide plate is adhered to or integrated with the panel, a supporting mechanical strength may be improved in compared with the case where the light guide plate is separated from the panel, so the thickness of both the light guide plate and panel may be further reduced. Optionally, a thickness of the adhesive is in a range from 5 microns to 3000 microns. In the case that the thickness of the adhesive is larger than 5 microns, an air layer may be formed, so it is able maintain the light guide function even though the light guide plates have different refractive indexes. In the case that the thickness of the adhesive is smaller than 5 microns, the light guide function of the light guide plate may be adversely affected due to a fluctuation of light beam. The thickness of the display device may not be reduced in the case that the thickness of the adhesive is larger than 3000 microns. Optionally, the thickness of the adhesive is in a range from 100 microns to 1000 microns, so that the light guide function of the light guide plate may not be adversely affected, the thickness of the display device may be reduced, and it is able to prevent apexes of the prism film from touching the light guide plate to break the light guide plate.

It can be seen from the above description, according to the backlight module and the display device in at least one embodiment of the present disclosure, the prism film is arranged at the light-exiting side of the light guide plate, thereby leaving such a gap between the prism film and the light guide plate that the prism unit may not scratch the guide light plate, without leaving any redundant space there between, thereby reducing the thickness of the backlight module and reducing the overall thickness of the display module. According to the display device in at least one embodiment of the present disclosure, the prism film and the lower polarizer are formed integrally, so the display panel and the backlight module are formed integrally, thereby reducing the overall thickness of the display device.

The above embodiments are for illustrative purposes only, but shall not be used to limit the scope of the present disclosure. The embodiments and the features in the embodiments may be combined in a case of no confliction.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A backlight module, comprising a light guide plate and a prism film arranged at a light-exiting side of the light guide plate;
    wherein the light guide plate comprises a base portion and a side wall portion, the side wall portion is protubrant from the base portion to the prism film, to space apart the prism film from the base portion, and the base portion is integrated with the side wall portion.

2. The backlight module according to claim 1, wherein the prism film is adhered onto a light-exiting surface of the light guide plate through an adhesive.

3. The backlight module according to claim 2, wherein the adhesive is arranged at an edge of the light-exiting surface of the light guide plate.

4. The backlight module according to claim 2, wherein a thickness of the adhesive is in a range from 5 microns to 3000 microns.

5. The backlight module according to claim 4, wherein the adhesive is at least one of a resin adhesive, a silica gel adhesive and a rubber adhesive.

6. The backlight module according to claim 4, wherein the thickness of the adhesive is in a range from 100 microns to 1000 microns.

7. The backlight module according to claim 1, wherein the light guide plate and the prism film are integrated.

8. The backlight module according to claim 1, wherein the prism film is an inverse prism film provided with a triangular prism unit, and an apex of the triangular prism unit is arranged opposite to the light-exiting surface of the light guide plate; the apex of the triangular prism unit is spaced apart from the light-exiting surface of the light guide plate.

9. The backlight module according to any claim 1, wherein the light guide plate is a glass light guide plate.

10. The backlight module according to claim 1, wherein an adhesive layer is arranged at a side of the spacer adjacent to the inverse prism film, to adhere the spacer onto the inverse prism film.

11. The backlight module according to claim 1, wherein adhesive layers are respectively arranged at a side of the spacer adjacent to the inverse prism film and a side of the spacer adjacent to the light guide plate, to adhere the spacer onto the inverse prism film and the light guide plate.

12. A display device comprising the backlight module according to claim 1 and a polarizer arranged at the light-exiting side of the prism film.

13. The display device according to claim 12, wherein the prism film and the polarizer are integrated.

14. A display device comprising the backlight module according to claim 7 and a polarizer arranged at the light-exiting side of the prism film.

15. The display device according to claim 14, wherein the polarizer, the prism film and the light guide plate are integrated.

16. The display device according to claim 14, further comprising a first substrate, a second substrate and a display layer arranged between the first substrate and the second substrate, wherein the backlight module is arranged at a side of the second substrate away from the display layer, the polarizer is arranged between the second substrate and the backlight module, and the second substrate, the polarizer, the prism film and the light guide plate are integrated.

17. A mobile terminal comprising the display device according to claim 12.

* * * * *